United States Patent [19]

Lorette

[11] 3,758,599
[45] Sept. 11, 1973

[54] PRODUCTION OF ALKYL BENZENES
[75] Inventor: Nicholas Bernard Lorette, Lake Jackson, Tex.
[73] Assignee: The Dow Chemical Company, Midland, Mich.
[22] Filed: May 26, 1972
[21] Appl. No.: 257,102

[52] U.S. Cl..... 260/668 D, 260/666 PY, 260/668 R
[51] Int. Cl............................ C07c 5/18, C07c 5/02
[58] Field of Search..................... 260/668 R, 668 D, 260/666 PY

[56] References Cited
UNITED STATES PATENTS
3,591,647   7/1971   Kochi et al................... 260/666 PY
3,629,348   12/1971   Courduvelis et al.......... 260/666 PY Primary Examiner—Curtis R. Davis
Attorney—William M. Yates et al.

[57] ABSTRACT

Process for the production of alkyl benzenes wherein norbornenes are passed under superatmospheric pressure through a hydrogenation catalyst in the presence of hydrogen at a relatively low temperature i.e. 50°–250°C. and then passed through a reforming catalyst at a higher temperature i.e. 400°–600°C. and the alkyl benzenes are recovered.

12 Claims, No Drawings

PRODUCTION OF ALKYL BENZENES

BACKGROUND OF THE INVENTION

This invention relates to a process for the production of alkyl benzenes by first hydrogenating norbornenes and then reforming the products of hydrogenation into alkyl benzenes.

It is well known in the art (U. S. Pat. No. 3,007,977) that norbornene can be formed by the Diels-Alder addition of ethylene to cyclopentadiene. However, it is also known from Herndon et al., J. Physical Chemistry 68: 2016-2018 (1964) that norbornene decomposes at 350°C. back into the above compounds.

It is also known from U. S. Pat. No. 2,754,339 that bicyclic terpenes such as alpha pinene can be converted (i.e. dehydrogenated) almost exclusively to aromatic terpenes such as p-cymene with small amounts of trimethyl benzenes.

It was thus surprising to find that norbornenes could be converted i.e. reformed into valuable alkyl benzenes having the same number of carbon atoms at temperatures greater than about 400°C. if they were first hydrogenated.

SUMMARY OF THE INVENTION

It now has been discovered that alkyl benzenes can be prepared by a process in which norbornenes in the presence of from about 3 to about 15 moles of hydrogen per mole of norbornene are first passed at a liquid hourly space velocity (LHSV) of about 0.5 to about 5.0, a pressure from about 50 to 400 pounds per square inch gage (psig) and a temperature from about 50° to about 250°C. through a hydrogenation catalyst which is effective to hydrogenate olefinic unsaturation. The effluent from this hydrogenation reaction is then passed, under the same velocity and pressure conditions, through a reforming catalyst effective to convert saturated carbocyclics to aromatics at a temperature from about 400° to about 600°C. and the alkyl benzenes are recovered.

The norbornenes are melted or dissolved in a hydrocarbon solvent before they are hydrogenated. It is preferred to dissolve the norbornenes in a solvent therefor The process is carried out in a single pass over the catalysts to achieve a high conversion with a high yield of alkyl benzenes. Recycling of the hydrogenated norbornenes gives higher conversion and higher yields.

The process can be conducted in a single reactor having a layered catalyst bed with the active catalyst beds in opposite ends thereof separated by an inert support material.

Alternatively, the process can be conducted in two separate reactors with the hydrogenation catalyst in the first reactor and the reforming catalyst located in the other reactor.

DETAILED DESCRIPTION

The norbornenes which can be used in this invention are norbornene, 5-methyl-2-norbornene, 5-ethyl-2-norbornene, norbornadiene, 5-methyl-2,5-norbornadiene, 5-ethyl-2,5-norbornadiene, and related compounds.

For the purposes of this invention the term norbornenes is generic to lower alkyl norbornenes and norbornadienes. These compounds are readily available from the Diels-Alder addition of alkenes and alkynes to cyclopentadienes.

These norbornenes are combined with about 3 to about 15 moles of hydrogen per mole of hydrocarbon feed, preferably from about 4 to about 12 moles of hydrogen, over a hydrogenation catalyst which is effective to hydrogenate olefinic unsaturation. The catalysts used are those which are well known to those skilled in the art and are commercially available.

Typical catalysts contain 0.15-5 percent platinum supported on a refractory support such as alumina. Other metals that can be used are palladium, rhodium, rhenium, and the like.

The catalysts used for the hydrogenation step are preferably also used for the reforming step. If desired, different commercial catalysts can be used for the reforming step. Typical catalysts of this type are platinum, palladium and rhenium.

The aforementioned norbornenes are either melted or dissolved in a hydrocarbon solvent before they are hydrogenated. The amount of solvent used is about 50 to about 90 volume percent. Typical hydrocarbon solvents are saturated aliphatic solvents such as petroleum ether and naphthas and the like, and carbocyclic solvents such as cyclohexane, diethylcyclohexane, methylcyclopentane, methylcyclohexane and the like.

The temperature in the hydrogenation zone is maintained at a temperature from about 50° to about 250° with the preferred range being from about 100° to about 250°C.

The norbornenes together with the hydrogen gas is passed through the hydrogenation catalyst at a liquid hourly space velocity from about 0.5 to about 5.0 and preferably in the range from about 0.5 to about 3.0.

The pressure in the hydrogenation zone is maintained in the range from about 50 to about 400 pounds per square inch gauge with the preferred pressure being in the range from about 175 to about 300 psig.

After the hydrogenation reaction the effluent is passed directly, under the same velocity and pressure conditions to a reforming zone having a catalyst therein effective to convert saturated carbocyclics to aromatics. The temperature of the reforming zone is maintained at a temperature from about 400° to about 600°C. and preferably from about 425° to about 525°C.

Following the hydrogenation and reforming steps, the reaction mixture is separated by distillation to yield the desired aromatics.

The following examples are presented to illustrate but not limit the invention.

EXAMPLES 1 AND 2

A one inch external diameter stainless steel pipe 38 inches long having a volume of 400 cc. was packed with 150 cc. of a commercial 0.5 weight per cent platinum catalyst supported on 1/16 inch alumina extrusions. One hundred cubic centimeters of this catalyst was placed in the lower third of the reactor and 50 cc. was placed in the upper third of the reactor. Alpha alumina balls ¼ inch in diameter were placed in the reactor below, between, and above the catalyst layers to provide a layered catalyst bed.

The reactor tube was wrapped and heated by resistance wires to provide an upper catalyst zone heated to 200°C. ± 10° and a lower catalyst zone heated to 430°C. ± 20°.

A mixture of 80.0 weight per cent diethylcyclohexane and 20.0 weight percent norbornene in the presence of hydrogen gas was fed into the upper part of the reactor under a pressure of 200 psig and downwardly through both catalyst zones.

The effluent gas was condensed and separated by distillation to produce toluene.

The results of these examples are shown in Table I below:

TABLE I.—CONVERTING NORBORNENE

| | Temp. ° C. | | LHSV | Norbornene conversion | Mol. ratios $H_2$/NB[1] | Yield toluene | NB[1] selectivity |
|---|---|---|---|---|---|---|---|
| | Upper zone | Lower zone | | | | | |
| Example: | | | | | | | |
| 1 | 200 | 430 | 1.5 | 79.7 | 4.0 | 66.4 | 97.0 |
| 2 | 200 | 450 | 1.5 | 95.6 | 3.9 | 87.2 | 94.2 |
| 3 | 200 | 450 | 0.5 | 99.8 | 11.0 | 99.8 | 91.0 |

[1] Norbornene.

EXAMPLE 3

Following the procedure of Examples 1 and 2 norbornadiene (no solvent) was passed through the catalyst zones, the conditions and results are reported in Table I.

In order to verify and confirm the foregoing examples the following experiments were conducted.

EXPERIMENT 1

A reactor similar to that used in Example 1 was packed with 150 cc. of 0.5 percent platinum on 1/16 inch alumina extrusions. The remainder of the reactor above and below the catalyst bed was packed with ⅛ inch alumina balls.

The catalyst bed was heated to 445°C. and 75.68 weight percent cyclohexane mixed with 24.11 percent norbornene was passed through the catalyst bed with hydrogen at a mole ratio of $H_2$/hydrocarbon of 5.8 with a LHSV of 1.2. The effluent was recovered and analyzed.

The results are shown below:

| Compound | Moles In | Moles Out |
|---|---|---|
| cyclohexane | 3.16 | 0.57 |
| methyl cyclopentane | | 0.27 |
| benzene | | 2.41 |
| norbornene | 0.90 | 0.01 |
| toluene | | 0.03 |
| cyclopentane | | 0.52 |

This experiment shows that norbornene cannot be reformed directly into toluene with any practical degree of success.

EXPERIMENT 2

Using the same reactor as in Experiment 1, 88.3 percent cyclohexane mixed with 11.7 percent norbornene was passed through the catalyst bed operating at a temperature of 220°C. The $H_2$/hydrocarbon mole ration was 3, the LHSV was 0.8 and the pressure was 225 psig. The results are shown below:

| Compound | Moles In | Moles Out |
|---|---|---|
| cyclohexane | 6.18 | 6.14 |
| norbornene | 0.72 | — |
| norbornane | — | 0.71 |

From a consideration of Experiments 1 and 2 it is evident that in Examples 1–3 the norbornenes are first hydrogenated and saturated in the low temperature catalyst zone and then the formed norbornanes are reformed into aromatics in the in the second or higher temperature zone. Furthermore, it is apparent that the reforming step (Experiment No. 1) cannot be directly applied to norbornenes.

EXAMPLE 4

Following the procedure of Example 1 using a single catalyst bed operating at 220°C., 5-methyl-2-norbornene was treated and analyzed to give the following results.

| Compound | Moles In | Moles Out |
|---|---|---|
| cyclohexane | 3.32 | 3.25 |
| 5-methyl-2-norbornene | 0.713 | 0.011 |
| 2-methyl-norbornane | | 0.522 |
| ethyl cyclohexane | | 0.001 |
| dimethylcyclohexanes | | 0.153 |

The desired 2-methyl-norbornane was then distilled from the recovered mixture diluted with additional cyclohexane, and recycled back to the same catalyst bed under the same conditions except that the catalyst bed was heated to 465°C. After recovery and analysis of the products, the results were found to be as follows.

| Compound | Moles In | Moles Out | Mole % Yield |
|---|---|---|---|
| cyclohexane | 2.47 | 0.56 | |
| benzene | | 1.74 | 91.2* |
| 2-methylnorbornane | 0.381 | 0.001 | |
| dimethylcyclohexane | 0.143 | 0.031 | |
| ethylcyclohexane | | 0.011 | |
| ethyl benzene | | 0.062 | 12.89 |
| p-xylene | | 0.040 | 8.32 |
| m-xylene | | 0.144 | 29.94 |
| o-xylene | | 0.137 | 28.48 |
| toluene | | 0.011 | 2.28 |

* based on the cyclohexane converted

EXAMPLE 5

Following similar conditions of Example 4, 5-ethyl-2-norbornene was treated to form 5-ethyl-norbornane which was then recovered and fed back with additional solvent to the same catalyst bed heated to a higher temperature. The results are given below.

| Compound | Moles In | Moles Out | Mole % Yield |
|---|---|---|---|
| cyclohexane | 4.49 | 0.90 | |
| methylcyclopentene | | 0.23 | |
| benzene | | 3.33 | |
| 2-ethylnorbornane | 0.739 | 0.003 | |
| $C_9$-cyclopentanes and cyclohexanes | 0.148 | 0.50 | |
| toluene | | 0.070 | 8.39 |
| xylenes | | 0.015 | 1.80 |
| normal and isopropyl benzenes | | 0.124 | 14.87 |
| 1-methyl-2-ethylbenzene | | 0.239 | 28.66 |
| 1-methyl-3-ethylbenzene | | 0.168 | 20.14 |
| 1-methyl-4-ethylbenzene | | 0.062 | 7.43 |
| trimethyl benzenes | | 0.063 | 7.55 |

I claim:

1. A process for the production of alkyl benzenes which comprises
   a. passing norbornenes in the presence of from about 3 to about 15 moles of hydrogen per mole of hydrocarbon feed at a LHSV of from about 0.5 to about 5.0 and a pressure from about 50 to about 400 psig through a hydrogenation catalyst effective to hydrogenate olefinic unsaturation at a temperature from about 50° to about 250°C., b. passing the effluent under the same LHSV and pressure conditions through a reforming catalyst effective to convert saturated carbocyclics to aromatics at a temperature from about 400° to about 600°C., and c. recovering the alkyl benzenes.

2. The process as set forth in claim 1 wherein the norbornenes are dissolved in a hydrocarbon solvent.

3. The process as set forth in claim 2 wherein the norbornenes are dissolved in a carbocyclic solvent.

4. The process as set forth in claim 3 wherein norbornene is treated.

5. The process as set forth in claim 3 wherein 5-methyl-2-norbornene is treated.

6. The process as set forth in claim 3 wherein 5-ethyl-2-norbornene is treated.

7. The process as set forth in claim 3 wherein norbornadiene is treated.

8. A process for the production of alkyl benzenes which comprises a. passing norbornenes, in the presence of from about 4 to about 12 moles of hydrogen per mole of hydrocarbon feed, at a LHSV of from about 0.5 to about 5.0 and a pressure from about 175 to about 300 psig through a hydrogenation catalyst effective to hydrogenate olefinic unsaturation at a temperature from about 100° to about 225°C., b. passing the effluent under the same LHSV and pressure conditions through a reforming catalyst effective to convert saturated carbocyclics to aromatics at a temperature from about 425° to about 525°C. and c. recovering the alkyl benzenes.

9. The process as set forth in claim 8 wherein the norbornenes are dissolved in a carbocyclic solvent.

10. The process as set forth in claim 7 wherein the norbornenes are dissolved in about 50 to about 90 mole percent of a carbocyclic solvent.

11. The process as set forth in claim 7 wherein the carbocyclic solvent is cyclohexane.

12. The process as set forth in claim 7 wherein the carbocyclic solvent is diethyl cyclohexane.

* * * * *